United States Patent [19]
Tong et al.

[11] Patent Number: 5,464,453
[45] Date of Patent: Nov. 7, 1995

[54] METHOD TO FABRICATE A RELIABLE ELECTRICAL STORAGE DEVICE AND THE DEVICE THEREOF

[75] Inventors: Robert R. Tong, Sunnyvale; James M. Poplett, Cupertino; Alan B. McEwen, Palo Alto; Gary E. Mason, Sunnyvale; Mark L. Goodwin, Santa Cruz; K. C. Tsai, Saratoga, all of Calif.; Ronald L. Anderson, Lina Lakes; James P. Nelson, Shoreview, both of Minn.

[73] Assignee: Pinnacle Research Institute, Inc., Los Gatos, Calif.

[21] Appl. No.: 947,294

[22] Filed: Sep. 18, 1992

Related U.S. Application Data

[63] Continuation-in-part of Ser. No. 947,414, Sep. 18, 1992.
[51] Int. Cl.⁶ ...................................................... H01G 7/00
[52] U.S. Cl. ...................... 29/25.03; 29/623.5; 29/623.1
[58] Field of Search ............................... 29/25.03, 623.5, 29/25.01, 25.02, 623.1, 623.2, 623.3, 623.4

[56] References Cited

U.S. PATENT DOCUMENTS

| | | | |
|---|---|---|---|
| 3,288,641 | 11/1966 | Rightmire . | |
| 3,536,963 | 10/1970 | Boos | 317/230 |
| 3,562,008 | 2/1971 | Martinsons et al. . | |
| 3,718,551 | 2/1973 | Martinsons | 204/98 |
| 4,052,271 | 10/1977 | Beer | 204/38 |
| 4,198,476 | 4/1980 | DiSalvo, Jr. et al. | 429/194 |
| 4,548,880 | 10/1985 | Suzuki et al. | 429/162 |
| 4,555,745 | 11/1985 | Westermeir et al. | 361/320 |
| 4,557,983 | 12/1985 | Sauer | 429/27 |
| 4,572,843 | 2/1986 | Saito et al. | 427/53.1 |
| 4,663,824 | 5/1987 | Kenmochi | 29/570 |
| 4,764,181 | 8/1988 | Nakano et al. | 29/570.1 |
| 4,774,193 | 9/1988 | Juergens | 437/4 |

(List continued on next page.)

FOREIGN PATENT DOCUMENTS

| | | |
|---|---|---|
| 1196683 | 11/1985 | Canada . |
| 4427 | 1/1982 | European Pat. Off. . |
| 044535 | 10/1980 | United Kingdom . |

OTHER PUBLICATIONS

R. S. Yeo et al., *J. Electrochem. Soc. Electrochemical Science and Technology*, vol. 128, No. 9, pp. 1900–1904, Sep. 1981.
R. S. Yeo et al., in *Abstracts of meeting of The Electrochemical Society*, Oct. 14–19, 1979, Abstract No. 652, p. 1637, published 1979.
L. D. Burke et al., in *J. Electroanal. Chem. 112*, (1980), pp. 39–50.
D. Galizzioli et al., in *Journal of Applied Electrochemistry*, vol. 4, (1974), pp. 57–67.
D. Galizzioli et al., in *Journal of Applied Electrochemistry*, vol. 5, (1975), pp. 203–214.
S. Trasatti et al, in *J. Elctroanal. Chem.*, vol. 29, (1971), App. 1–5.
S. Hadzi–Jordanov et al., in *J. Electochem. Soc. Electrochemical Science and Technology*, Sep. 1978, pp. 1471–1480.
S. H. Glarum et al., in *J. Electochem. Soc. Electrochemical Science and Technology*, Jul. 1980, pp. 1467–1474.

(List continued on next page.)

Primary Examiner—Brian E. Hearn
Assistant Examiner—Kevin M. Picardat
Attorney, Agent, or Firm—Phillips Moore Lempio & Finley

[57] ABSTRACT

The present invention relates to an improved method to produce an electrical storage device having useful characteristics such as higher charge density, small volume, long-term reliable charge/discharge cycles, low leakage current, and the like. The dry preunit has useful properties in that it can be stored for long periods prior to contact with a non-aqueous or aqueous electrolyte. When the electrode surfaces are contacted with a non-aqueous or aqueous electrolyte, the novel capacitors produced are useful as a portable power supply in applications such as in defibrillator, electrical vehicles, radiotelephones etc.

46 Claims, 7 Drawing Sheets

U.S. PATENT DOCUMENTS

| | | | |
|---|---|---|---|
| 4,800,142 | 1/1989 | Bish et al. | 429/130 |
| 4,816,356 | 3/1989 | Balkanski | 429/191 |
| 4,862,328 | 8/1989 | Morimoto et al. | 361/502 |
| 5,032,426 | 7/1991 | Sumner, Jr. | 427/96 |
| 5,055,169 | 10/1991 | Hock, Jr. et al. | 204/192.31 |
| 5,062,025 | 10/1991 | Verhoeven et al. | 361/509 |
| 5,063,340 | 11/1991 | Katenowsky . | |
| 5,072,335 | 12/1991 | Kurabayashi et al. | 361/502 |
| 5,085,955 | 2/1992 | Cipriano | 429/197 |
| 5,116,695 | 5/1992 | Rao et al. | 429/12 |
| 5,116,701 | 5/1992 | Kalisz | 429/130 |
| 5,121,288 | 6/1992 | Maeoka et al. | 361/329 |
| 5,141,828 | 8/1992 | Bennion et al. | 429/210 |
| 5,230,990 | 7/1993 | Iwasaki et al. | 430/321 |
| 5,268,006 | 12/1993 | Ueno et al. | 29/25.03 |

OTHER PUBLICATIONS

B. E. Conway et al., in *Trans. Faraday Soc.*, (1962), vol. 58, p. 2493ff.

M. Pham–Thi et al., the *Journal of Materials Science Letters*, vol. 5, p. 415, (1986).

B. E. Conway, *J. Electrochem. Soc.*, vol. 138 (#6), pp. 1539–1548, (Jun. 1991).

H. Lee, et al., *IEEE Transactions on Magnetics*, vol. 25 (#1), p. 324, (Jan. 1989).

G. Bullard, et al., *IEEE Transaction on Magnetics*, vol. 25 (#1) p. 102, (Jan. 1989).

A. Yoshida et al., *IEEE Transactions on Components, Hybrids and Manufacturing Technology*, "An Electric Double–Layer Capacitor with Activated Carbon Fiber Electrodes", vol. CHMT–10, #1, pp. 100–103, (Mar. 1987).

T. Suzuki, et al., *NEC Research and Development*, "Improved Self Discharge Characteristics of the Electric Double Layer Capacitor", No. 82, pp. 118–123, Jul. 1986.

S. Sekido, *Solid State Ionics*, vol. 9, 10, pp. 777–782, (1983).

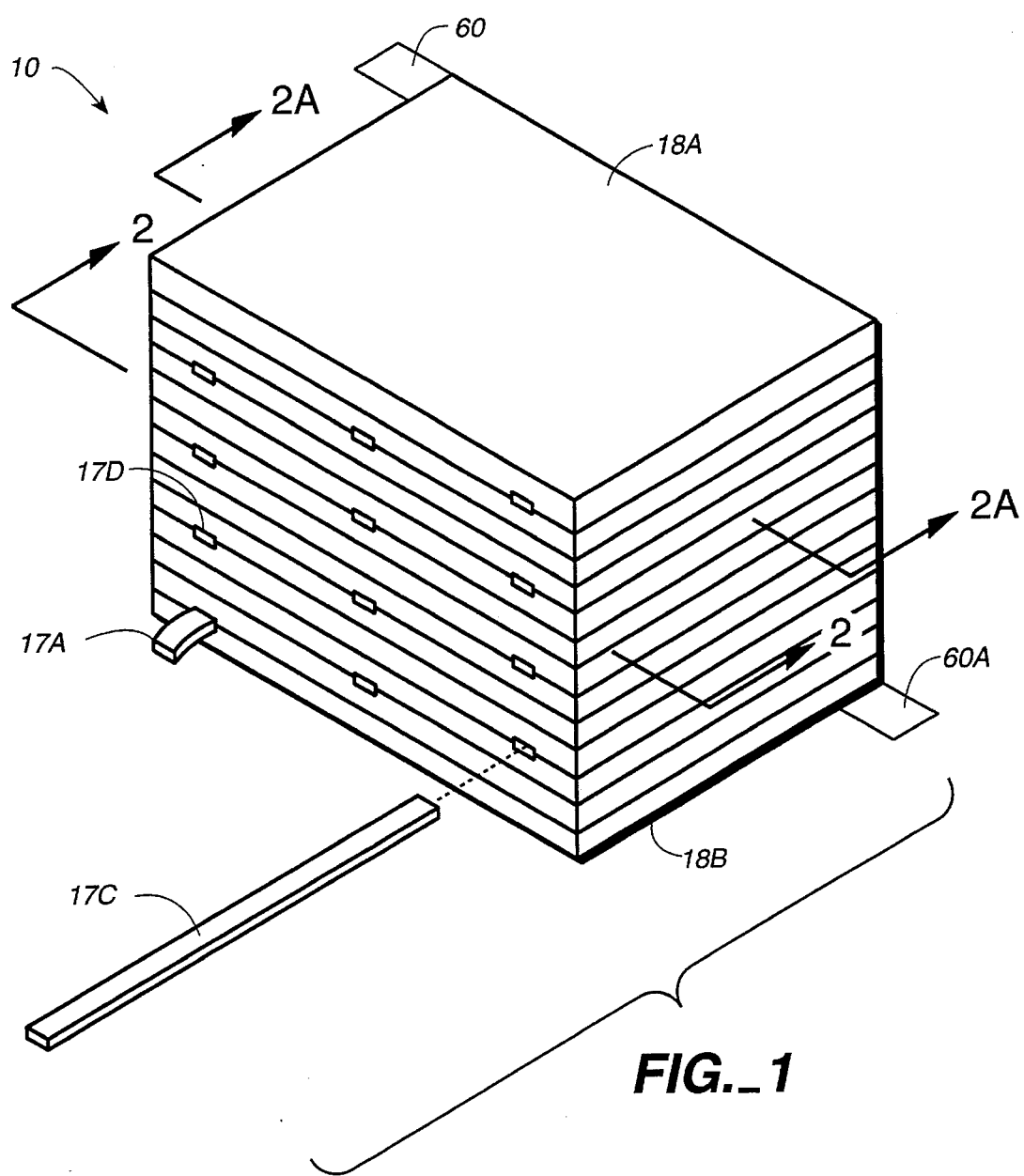
FIG._1

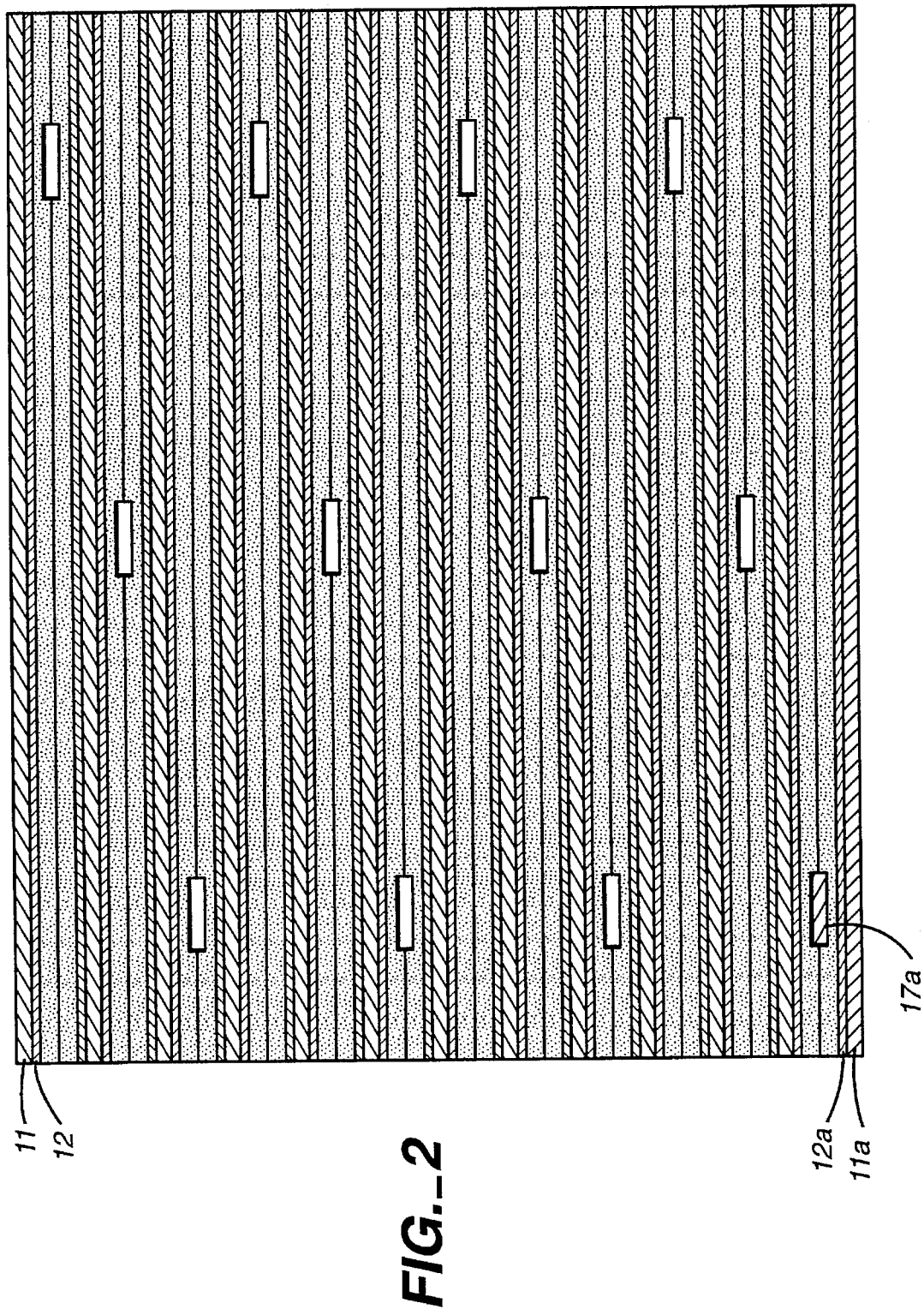
FIG._2

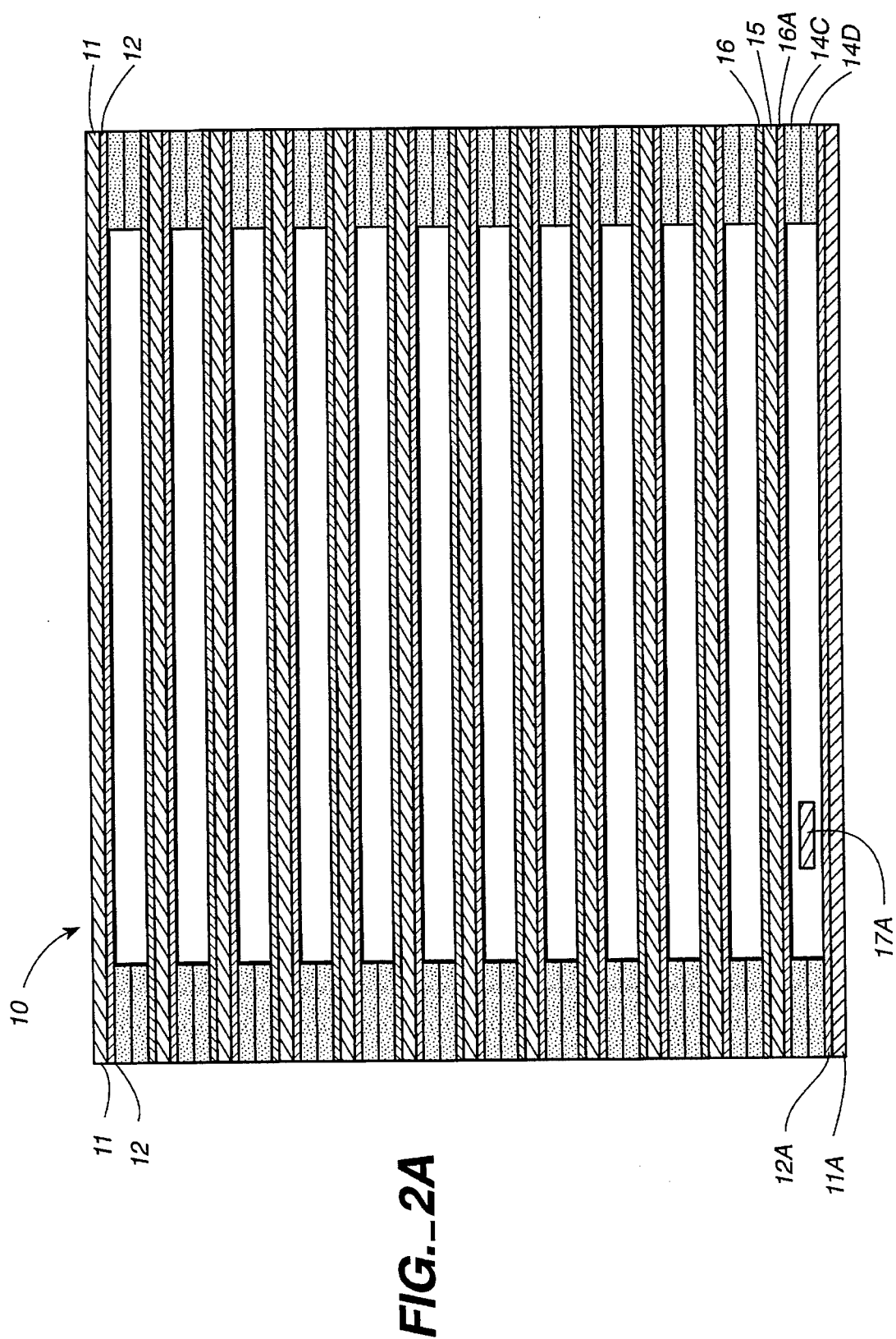
FIG._2A

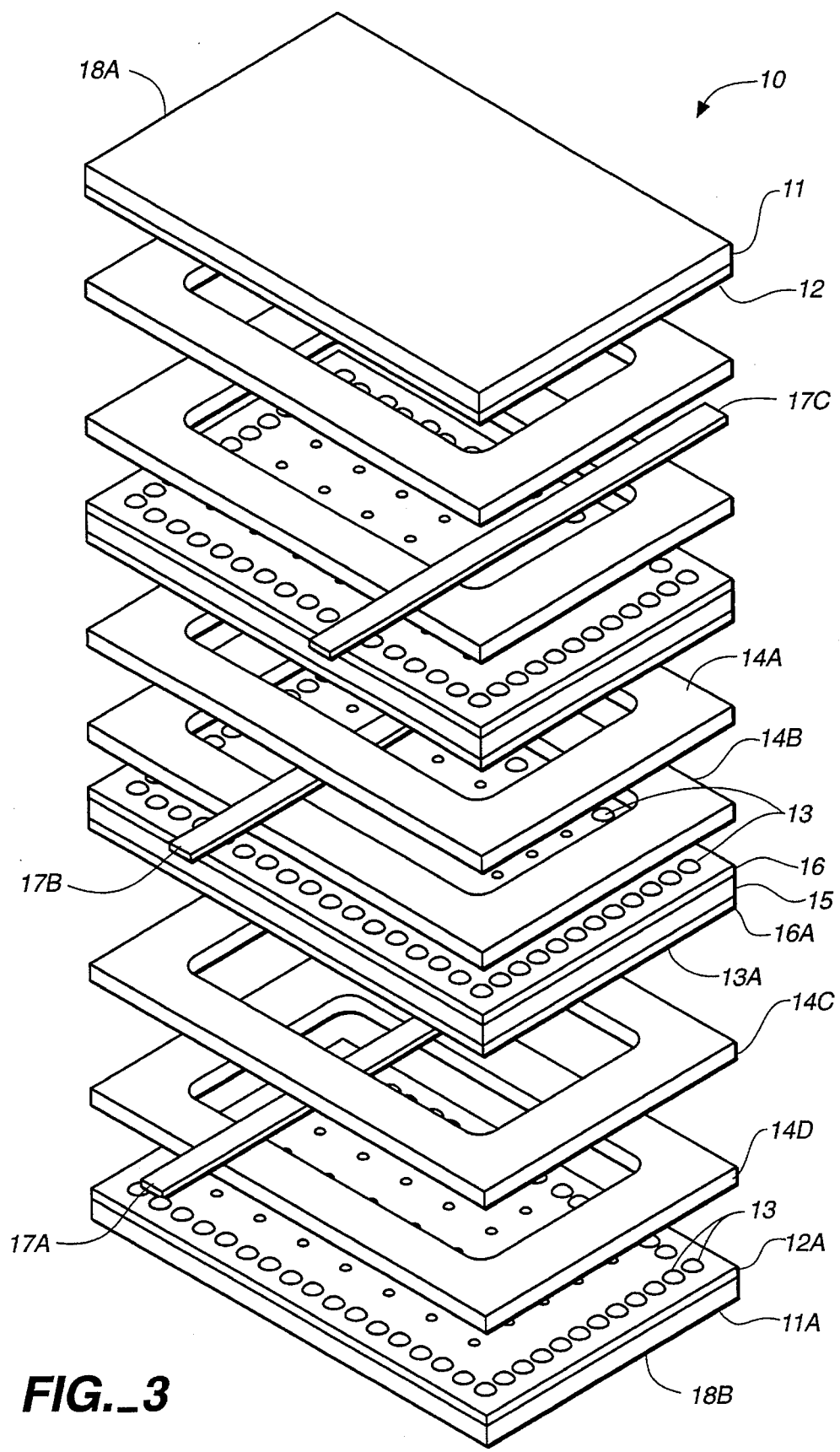
FIG._3

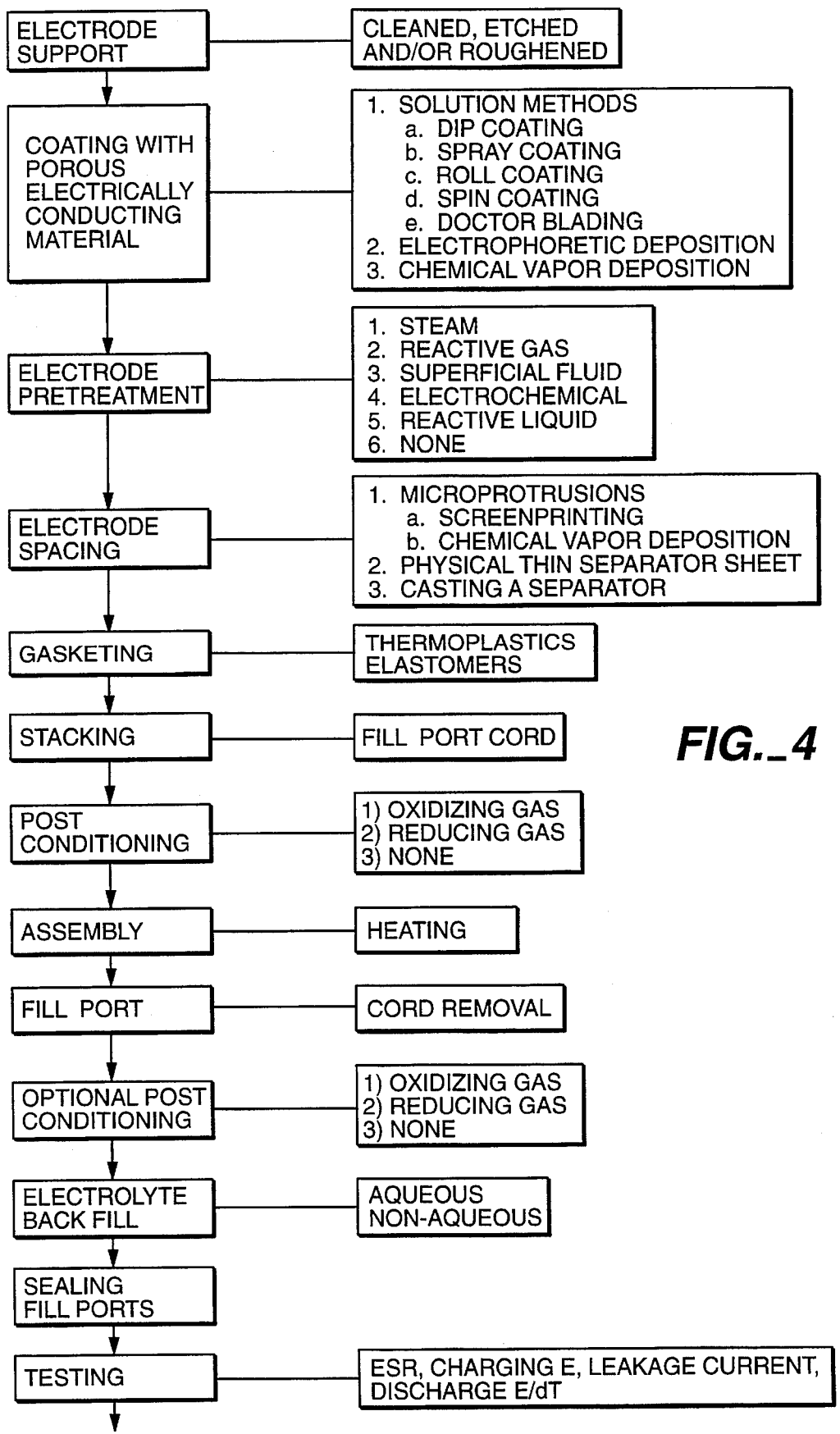
FIG._4

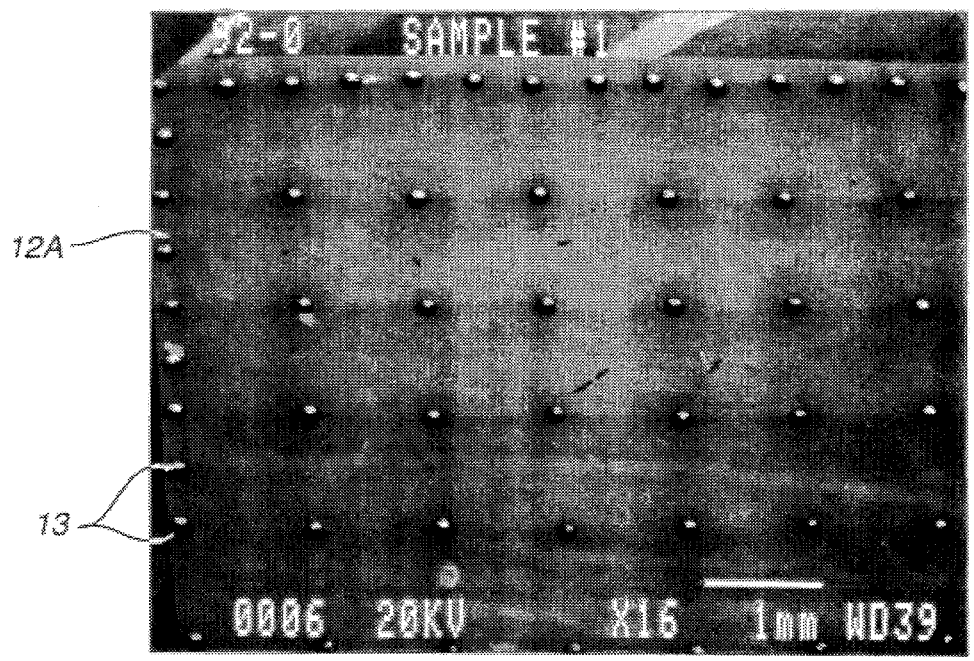
FIG._5
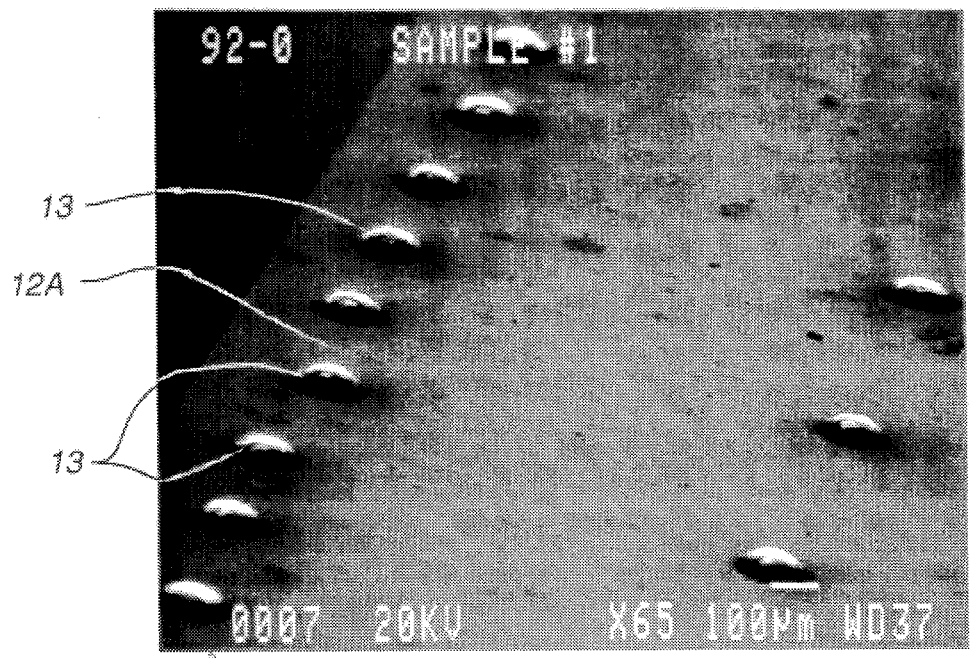
FIG._5A

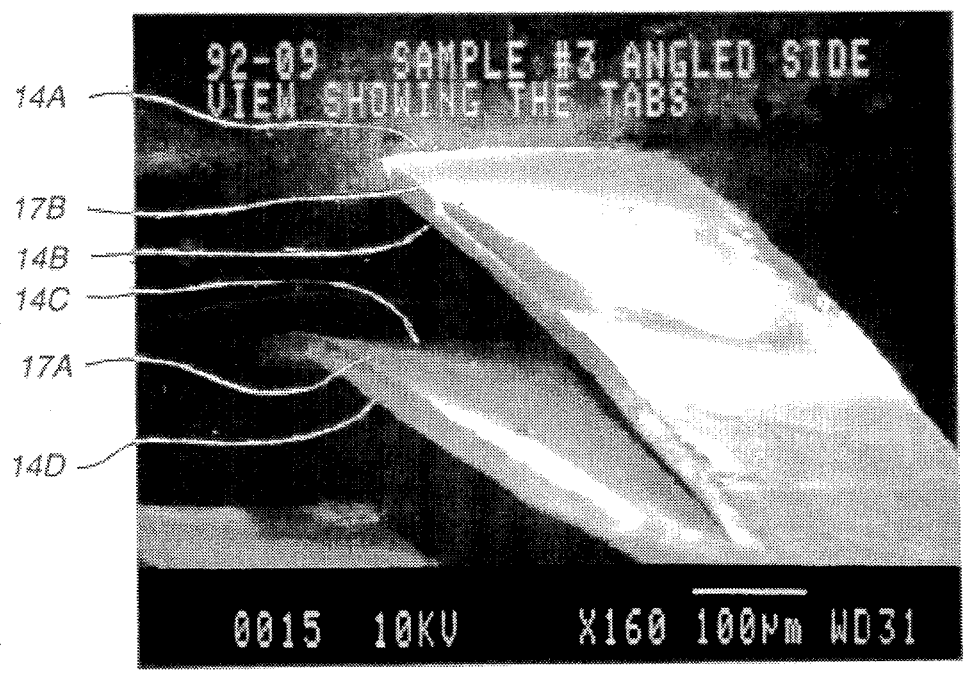
FIG._6
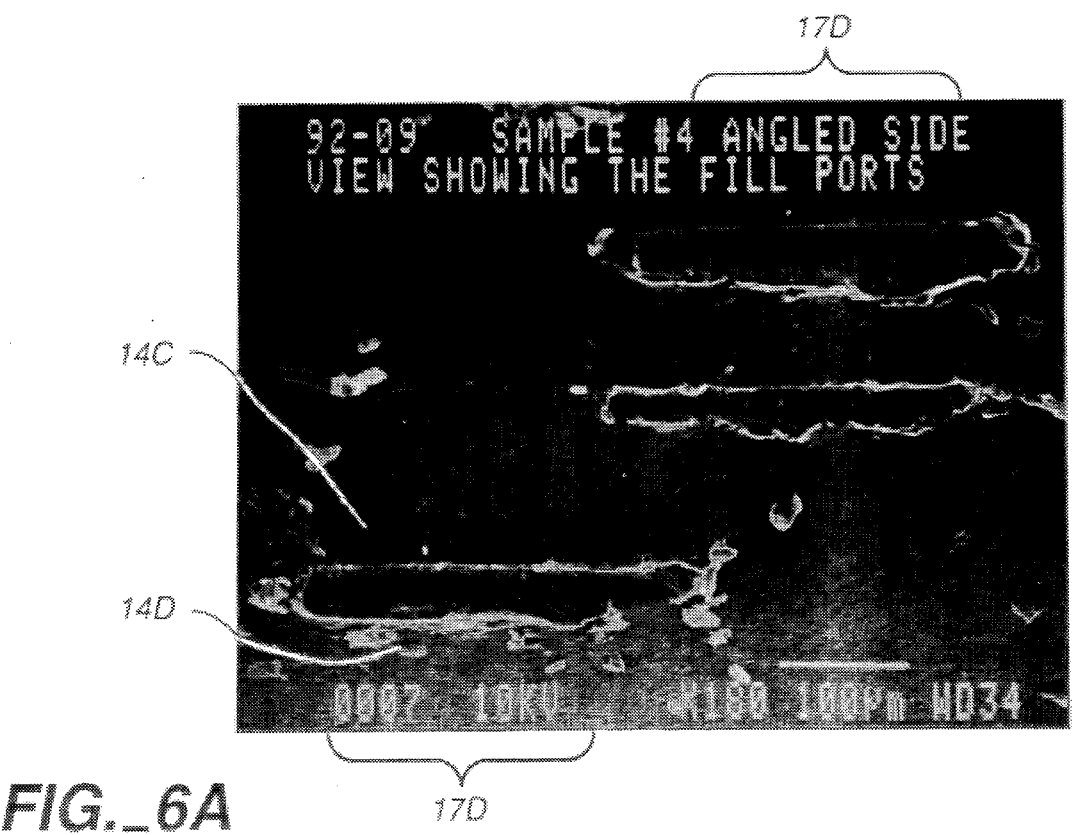
FIG._6A

METHOD TO FABRICATE A RELIABLE ELECTRICAL STORAGE DEVICE AND THE DEVICE THEREOF

RELATED APPLICATIONS

The present application is a continuation-in-part of U.S. application Ser. No. 07/947,414 filed Sep. 18, 1992 which is incorporated by reference in its entirety.

BACKGROUND OF THE INVENTION

1. Field of the Invention

The present invention relates to an improved method to produce a useful electrical charge storage device. The device, a capacitor, has improved space requirements (small size and true bipolar construction), low current leakage, low equivalent series resistance, high voltage per cell, high total voltage, high charge capacity and a long term useful lifetime.

2. Description of the Related Art

There has been significant research over the years regarding the obtaining of a useful reliable electrical storage device, such as a capacitor or a battery. Large energy storage capabilities are common for batteries; however, batteries also display low power densities. In contrast, electrolytic capacitors possess very high power densities and a limited energy density. On the other hand, carbon based double-layer capacitors have a large energy density; but, due to their high equivalent series resistance (ESR), carbon electrodes have low power capabilities. It would therefore be highly desirable to have an electrical storage device that had both large energy and power densities.

A recent review by B. E. Conway in *J. Electrochem. Soc.*, Vol. 138 (#6), p. 1539 (June 1991) discusses the transition from "supercapacitor" to "battery" in electrochemical energy storage. He also identifies performance characteristics of various capacitor devices.

D. Craig, Canadian Patent No. 1,196,683, issued in November 1985, discusses the usefulness of electric storage devices based on ceramic-oxide coated electrodes and pseudo-capacitance. However, attempts to utilize this disclosure have resulted in capacitors which have inconsistent electrical properties and which are often unreliable. These devices cannot be charged to 1.0 V/cell and have large, unsatisfactory leakage currents. Furthermore, these devices have a very low cycle life. In addition, the disclosed packaging is inefficient.

M. Matroka and R. Hackbart, U.S. Pat. No. 5,121,288, issued Jun. 9, 1992, discuss a capacitive power supply based on the Craig patent which is not enabling for the present invention. A capacitor configuration as a power supply for a radiotelephone is taught; however, no enabling disclosure for the capacitor is taught.

J. Kalenowsky, U.S. Pat. No. 5,063,340, issued Nov. 5, 1991, discusses a capacitive power supply having a charge equalization circuit. This circuit allows a multicell capacitor to be charged without overcharging the individual cells. The present invention does not require a charge equalization circuit to fully charge a multicell stack configuration without overcharging an intermediate cell.

H. Lee et al. in *IEEE Transactions on Magnetic*, vol 25 (#1), p.324 (January 1989) and G. Bullard, et al., in *IEEE Transactions on Magnetics*, vol.25 (#1) p. 102 (January 1989) discuss the pulse power characteristics of high-energy ceramic-oxide based double-layer capacitors. In this reference various performance characteristics are discussed, with no enabling discussion of the construction methodology. The present invention provides a more reliable device with more efficient packaging.

Carbon electrode based double-layer capacitors have been extensively developed based on the original work of Rightmire U.S. Pat. No. 3,288,641. A. Yoshida et al in *IEEE Transactions on Components, Hybrids and Manufacturing Technology*, Vol. CHMT-10, #1, P-100–103 (March 1987) discuss an electric double-layer capacitor composed of activated carbon fiber electrodes and a non-aqueous electrolyte. In addition, the packaging of this double-layer capacitor is revealed. These devices are on the order of 0.4–1 cc in volume with an energy storage capability of around 1–10 J/cc.

T. Suzuki et al. in *NEC Research and Development*, No. 82, pp. 118–123, July 1986, disclose improved self-discharge characteristics of the carbon electric double-layer capacitor with the use of porous separator materials on the order of 0.004 inches thick. An inherent problem of carbon based electrodes is the low conductivity of the material resulting in a low current density being delivered from these devices. A second difficulty is that the construction of multicell stacks is not done in a true bipolar electrode configuration. This results in inefficient packaging and lower energy and power density values.

Additional references of interest include, for example:

The state of solid state micro power sources is reviewed by S. Sekido in *Solid State Ionics*, Vol. 9, 10, pp. 777–782 (1983). M. Pham-Thi et al. in the *Journal of Materials Science Letters*, Vol. 5, p. 415 (1986) discuss the percolation threshold and interface optimization in carbon based solid electrolyte double-layer capacitors.

Various disclosures discuss the fabrication of oxide coated electrodes and the application of these electrodes in the chlor-alkali industry for the electrochemical generation of chlorine. See for example: V. Hock et al. U.S. Pat. No. 5,055,169 issued Oct. 8, 1991; H. Beer U.S. Pat. No. 4,052,271 issued Oct. 4, 1977; and A. Martinsons et al. U.S. Pat. No. 3,562,008 issued Feb. 9, 1971. These electrodes, however, in general do not have the high surface areas required for an efficient double-layer capacitor electrode.

Additional references of general interest include U.S. Pat. Nos. 3,718,551; 4,052,271; and 5,055,169.

None of these references individually or collectively teach or suggest the present invention.

All of these applications, patents, articles, references, standards, etc. cited in this application are incorporated herein by reference in their entirety.

It would be very useful to have an improved method to produce a reliable long-term electrical storage device and the device thereof. The present invention provides such an improved method and improved device with energy densities of at least 20–90 J/cc.

SUMMARY OF THE INVENTION

In one aspect, the present invention relates to an improved method to produce a dry preunit (10) of an electrical storage device for storage of electrical charge in a condition for contact with a non-aqueous or aqueous electrolyte, which method comprises:

(a) preparing a thin, substantially flat sheet of electrically conducting support material coated on each flat side with the same or different thin layer of a second electrically conducting material having a high surface area, optionally with the provision that both flat sides of the electrically conducting support is a sheet having the perimeter edge surfaces either:
  (i) having a thin layer of second high surface area electrically conducting material,
  (ii) are partly devoid of second high surface area electrically conducting material, or
  (iii) are devoid of second high surface area electrically conducting material;
(b) creating an ion permeable or semipermeable space separator which is stable to the aqueous or non-aqueous electrolyte which is obtained by:
  (i) depositing substantially uniform in height groups of electrically insulating microprotrusions stable to the aqueous or non-queous electrolyte, on the surface of at least one side of the thin layer of the second electrically conducting material,
  (ii) placing a thin precut ion permeable or semipermeable separator on one surface of the second electrically conducting material, or
  (iii) casting an ion permeable or semipermeable thin layer on the surface of at least one side of the electrically conducting material, or
  (iv) creating a thin air space as separator;
(c) contacting the perimeter edge surface of one or both sides of the thin sheet of step (b) with one or more thin layers of synthetic organic polymer as a gasket material selected from the group consisting of a thermoplastic and a thermoset polymer;
(d) placing on or within the gasket material and optionally across the thin sheet at least one thin cord of a different material which cord has a higher melting point ($T_m$) than the gasket polymer material and does not melt, flow, or permanently adhere to the gasket under the processing conditions;
(e) producing a repeating layered stack of the thin flat articles of sheet coated with metal oxide and separator produced in step (d) optionally having the end sheets consisting of a thicker support;
(f) heating the stack produced in step (e) at a temperature and applied pressure effective to cause the synthetic gasket material to flow, to adhere to, and to seal the edges of the stack creating a solid integral stack of layers of alternating electrically conductive sheet coated with second electrically conducting material and the ion permeable separator, optionally such that the gasket material creates a continuous integral enclosure;
(g) cooling the solid integral stack of step (f) optionally under slight pressure in an inert gas; and
(h) removing the at least one thin cord of different material between each layer creating at least one small opening between the layers of electrically conducting sheet coated with second electrically conducting material.

In one embodiment the exterior end sheets have only one side coated with second high surface area electrically conducting material. In another aspect, the present method includes a method to produce a dry preunit of a capacitor for storage of electrical charge, which method comprises:
(a) obtaining a thin flat metal sheet support wherein the metal is selected from titanium, zirconium, iron, copper, lead, tin, zinc or combinations thereof, having a thickness of between about 0.1 and 10 mil coated on each flat surface with a thin layer of at least one metal oxide having a high surface area independently selected from metal oxides of the group consisting of tin, lead, vanadium, titanium, ruthenium, tantalum, rhodium, osmium, iridium, iron, cobalt, nickel, copper, molybdenum, niobium, chromium, manganese, lanthanum or lanthanum series metals or alloys or combinations thereof, possibly containing a small percentage of additives to enhance electrical conductivity,
wherein the thin metal oxide layer has a thickness of between about 0.1 and 100 microns,
optionally with the provision that both flat surfaces of the electrically conducting sheet have the perimeter edge surfaces devoid of metal oxide;
(b) creating an ion permeable space separator which is stable to the aqueous or non-aqueous electrolyte selected from:
  (i) depositing a substantially uniform in height array of electrically insulating microprotrusions which are stable to an aqueous or non-aqueous electrolyte having a height of between about 0.1 and 10 mil on the surface of one or both sides of the thin layer of metal oxide,
  (ii) placing a thin precut ion permeable, electrically insulating separator having a thickness of between about 0.1 and 10 mil on one flat surface of the metal oxide layer;
  (iii) casting an ion permeable or semipermeable separator a having a thickness of between about 0.1 and 10 mil, on at least one surface of the second electrically conducting material; or
  (iv) creating a thin air space as a separator;
(c) contacting the perimeter edge surface of one or both sides of the thin electrically conducting sheet of step (b) with one or more thin layers of synthetic organic polymer as a gasket material wherein the polymer is selected from polyimides, TEFZEL® a (trademark of the DuPont Co. of Wilmington, Del. for fluorinated polymer), polyethylenes, polypropylenes, other polyolefins, polysulfone, other fluorinated or partly fluorinated polymers or combinations thereof;
(d) placing on or within the gasket material and optionally across the thin flat sheet at least one thin cord of a different material which has a higher melting temperature ($T_m$) than the polymeric gasket material, which cord does not melt, flow or adhere to the gasket material under the processing conditions described herein;
(e) assembling a repeating layered stack of the thin flat articles of sheet coated with metal oxide and separator produced in step (d) optionally having end sheets having only one side coated and/or being made of thicker support material;
(f) heating the layered stack of step (e) at 0° to 100° C. greater than $T_m$ causing the gasket material to flow, to adhere to, and to seal the edges of the layered stack creating a solid integral layered stack of sheet and separator optionally enclosing the stack in an integral polymer enclosure;
(g) cooling to ambient temperature the solid integral stack of step (f) in an inert environment; and
(h) removing the at least one thin cord between each layer creating at least one small opening between the electrode layers.

In other aspects, the present invention relates to the improved storage devices produced by the above cited methods when the electrodes are further contacted with an aqueous or non-aqueous electrolyte optionally deoxygenated.

BRIEF DESCRIPTION OF THE FIGURES

FIG. 1 is a perspective view of the exterior of the dry preunit (10) with the cords present (17A) and after being pulled out (17C).

FIG. 2 is a cross-sectional view of the dry preunit along line 2—2 showing the edge of the dry preunit prior to heating to fuse the gaskets. For depiction purposes only the cords have been removed in all except one case (17A). The end sheet support (11 and 11A) as well as the coating (12 and 12A) are also depicted.

FIG. 2A is a cross-sectional view of the dry preunit along line 2A—2A showing the central area of the dry preunit prior (again, for depiction purposes only most of the cords have been removed) to heating to fuse the gasket material (14C and 14D). The electrode support material (15) and the coating (16 and 16A) for the internal bipolar electrodes are depicted. The open space between electrode surfaces optionally contains microprotrusions, a thin porous film, or a cast porous film as a separator. FIG. 3 is a schematic representation of an exploded view of the dry preunit with cords present in the typical staggard configuration (17A, 17B, and 17C). Bipolar electrodes consisting of a support (15) and coating (16 and 16A) with microprotrusions (13) are depicted with gasket material (14A, 14B, 14C and 14D). The end plate assembly (18A and 18B) is depicted with coating on only one side.

FIG. 4 is a schematic of the steps in the fabrication of the dry pre-unit.

FIGS. 5 and 5A are scanning electron microscope (SEM) pictures of the electrode surfaces having microprotrusions at 16 power and 65 power, respectively.

FIGS. 6 (at 16 power) and 6A (at 65 power) are scanning electron microscope (SEM) pictures of the stacked device depicting the tabs 17A and fillports 17D of the dry preunit.

DETAILED DESCRIPTION OF THE INVENTION AND PREFERRED EMBODIMENTS

Definitions:

As used herein:

"Cord" or "tab" refers to the thin strips of material included in the method of manufacture of the dry preunit.

The removal of the cord produces the open fill ports.

"Electrically conducting support material" refers to any electrically conducting metal or metal alloy, electrically conducting polymer, electrically conducting ceramic, electrically conducting glass, or combinations thereof. Metals and metal alloys are preferred for producing stock units. The support material should have a conductivity of greater than about $10^{-4}$ S/cm.

"Second electrically conducting material" (having a high surface area) refers to porous electrode coating which may be of the same or different composition on each side of the support material. Preferred metal oxides include those independently selected from tin, lead, vanadium, titanium, ruthenium, tantalum, rhodium, osmium, iridium, iron, cobalt, nickel, copper, molybdenum, niobium, chromium, manganese, lanthanum, or lanthanum series metals or alloys or combinations thereof, and possibly containing additives like calcium to increase electrical conductivity.

Referring to FIGS. 1 to 5, a general description for the improved method to produce the dry pre-unit 10 is as follows:

The porous conducting members are formed from extremely fine divided particulate materials, e.g. Raney nickel, finely divided carbon, having a specific surface area in excess of 300 meter $^2$/cc and especially specific surface area in the range of from 500 meter $^2$/cc to 1500 meter $^2$/cc.

(A) Support Material Preparation

The electrode support (11, 11A and 15) is optionally etched or cleaned by a variety of conventional pickling and cleaning procedures.

In some experiments, if the metal surface is not etched it is too smooth. This smooth surface sometimes causes inadequate adhesion of the porous coating. The etch creates a suitable rough surface.

1. Wet Etching—A preferred procedure is contact of the metal support with aqueous inorganic strong acid, e.g. sulfuric acid, hydrochloric acid, hydrofluoric acid, nitric acid, perchloric acid or combinations thereof. The etching is usually performed at elevated temperatures of 50° to 95° C. (preferably 75° C.) for about 0.1 to 5 hr (preferably 0.5 hr.) followed by a water rinse. Room temperature acid etching is possible. An alkaline etch or an oxalic acid etch may also be used.

2. Dry Etching—The roughened support surface is obtained by sputtering, plasma treatment, and/or ion milling. A preferred procedure is Ar RF sputter etching at between around 0.001 and 1 torr with about 1 KeV energy at 13.5 Mhz. Commonly, 0.1–10 watts/cm2 power densities for about 1–60 minutes are used to clean and roughen the surface. Another procedure is to plasma etch the support with a reactive gas such as oxygen, tetrafluoromethane, and/or sulfurhexafluoride at around 0.1–30 torr for about 1–60 min.

3. Electrochemical Etching—The roughened surface is obtained by electrochemical oxidation treatment in a chloride or fluoride solution.

(B) Coating of Support Material

The high surface area electrically conducting coating material (12, 12A, 16 and 16A) is applied onto the support material.

1. Solution Methods—The porous coating material may originate from various reactive precursors in a solution or of a sol-gel composition. Numerous methods of application of these precursor compositions are feasible; but not limited to the following. A curing and/or pyrolysis process usually is performed to form the coating on the support. Pyrolysis of the metal salts is usually done in a controlled atmosphere (nitrogen, oxygen, water, and/or other inert and oxidative gasses) by means of a furnace and/or an infrared source.

(a) Dip Coating—The support is dipped into a solution or sol-gel, coating the support with a precursor coating, and subsequently cured by pyrolytic and other methods. Optionally, this process may be repeated to increase layer thickness. A preferred procedure is dipping the support material into a metal chloride alcohol solution followed by pyrolysis at between about 250° and 500° C. for 5–20 min in a 5–100% oxygen atmosphere. This process is repeated until the desired weight of coating is obtained. A final pyrolysis treatment at 250°–450° C. is done for 1–10 hrs. Typically about 1–30 mg/cm$^2$ of coating is deposited onto a support for a capacitance density of around 1–10 F per square centimeter electrode cross-sectional area. Another procedure is to create a sol-gel solution with ruthenium, silicon, titanium and/or other metal oxides and coat the support as above. By adjusting the PH, water concentration, solvent, and/or the presence of additives like oxalic acid, formamide, and/or surfactants the discharge frequency characteristics of the coating may be adjusted.

(b) Spray Coating—The coating solution is applied to the support by a spray method, cured, and optionally repeated to increase the thickness. A preferred procedure is to apply the coating solution to the substrate at a temperature of 0°–150° C. by means of an ultrasonic or other spray nozzle with a flow rate of around 0.1–5 ml/min in a carrier gas composed of nitrogen, oxygen and/or other reactive and inert gases. The coating characteristics can be controlled by the partial pressure of oxygen and other reactive gasses.

(c) Roll Coating—The precursor coating is applied by a roll coating methodology, cured, and optionally repeated to increase the thickness. The coatings used for dip coating are usable here.

(d) Spin Coating—A spin coating methodology is used to apply the precursor coating, and optionally repeated.

(e) Doctor Blading—A doctor blading methodology is used to apply the precursor coating, and optionally repeated.

2. Electrophoretic Deposition—The porous coating or precursor coating is applied to the support by electrophoretic deposition techniques, and optionally repeated.

3. Chemical Vapor Deposition—The porous coating or precursor coating may be applied by chemical vapor deposition techniques.

(C) Electrode Pretreatment

It has been found that a number of pretreatments (conditioning) or combinations thereof are useful to improve the electrical characteristics of the coating (e.g. electrochemical inertness, conductivity, performance characteristics, etc.). These treatments include for example:

1. Steam—The coated electrode is contacted with water saturated steam in a closed vessel at between 150° and 325° C. for between 1 to 6 hr. under autogenic pressure.

2. Reactive Gas The coated electrode is contacted one or more times with a reactive gas such as oxygen, ozone, hydrogen, peroxides, carbon monoxide, nitrous oxide, nitrogen dioxide, or nitric oxide at between ambient temperature and 300° C. at a reduced pressure or under pressure. A preferred procedure is to contact the coated electrode with flowing ozone at between about 5–20 weight percent in air at between ambient and 100° C. and 0.1–2000 torr pressure for 0.1–3 hrs.

3. Supercritical Fluid—The coated electrode is contacted with a supercritical fluid such as carbon dioxide, organic solvent, and/or water. A preferred procedure is treatment with supercritical water or carbon dioxide for 0.1–5 hrs by first raising the pressure and then the temperature to supercritical conditions.

4. Electrochemical The coated electrode is contacted with an anodic, current sufficient to evolve oxygen gas, and subsequently with a cathodic current. In one embodiment the electrode is contacted with 10 mA/cm$^2$ in sulfuric acid for about 5 min, to evolve oxygen gas. The electrode is then switched to a cathodic current and the open circuit potential is driven back to a potential of about 0.5 V (vs. NHE) without hydrogen gas evolution.

5. Reactive liquid The coated electrode is contacted with an oxidizing liquid such as aqueous solutions of hydrogen peroxide, ozone, sulfoxide, potassium permanganate, sodium perchlorate, chromium(VI) species and/or combinations thereof at temperatures around ambient to 100° C. for 0.1–6 hrs. A preferred procedure uses a 10–100 mg/l aqueous solution of ozone at 20°–50° C. for around 0.5–2 hrs. followed by an aqueous wash. An additional procedure is to treat the coated electrode in a chromate or dichromate solution.

(D) Spacing between Electrodes

A number of methods are available to obtain electrical insulation and properly defined spacing between the electrodes. These methods include, for example:

1. Microprotrusions—The separator between the electrodes is a matrix of small (in area and height) protrusions (13) on the surface of at least one side of the electrode. These microprotrusions may be composed of thermosets, thermoplastics, elastomers, ceramics, or other electrically insulating materials. Several methods of applying these microprotrusions are included but not limited to:

(a) Screen Printing— The microprotrusions are placed on the electrode surface by conventional screen printing. Various elastomers, thermosets, and thermoplastics are applied in this way. A preferred procedure is to use an acid resistant epoxy or Viton solution.

(b) Chemical Vapor Deposition—Microprotrusions are also placed on the electrode surface by depositing silica, titania and/or other insulating oxides or materials through a mask.

2. Physically thin separator sheet—The separator between the electrodes is a thin, substantially open structure material such as glass. A preferred material is 0.001–0.005 inch porous glass sheet available from Whatman Paper Ltd.

3. Casting a separator—The separator between the porous material is also obtained by casting a thin, substantially open structure film such as for, example, NAFION® (for a perfluorosulfonate polymer membrane, a trademark of W. E. Gore and Co., Elkton, Md.) polysulfones, or various aero- and sol-gels.

4. Air pace—The separator between the electrodes is also an air space which is subsequently occupied by the nonaqueous or aqueous electrolyte.

(E) Gasketing

The materials used for the gaskets (14A, 14B, 14C and 14D) at the edge of the active electrode surface include any organic polymer which is stable in the electrical/chemical environment, and to the processing conditions. Suitable polymers include, for example polyimide, TEFZEL®, polyethylene (high and low density), polypropylene, other polyolefins, polysulfone, other fluorinated or partly fluorinated polymers or combinations thereof. The gasket may be applied as a preformed material, screen printed, or by other methods.

(F) Cord for Fillport

The cord (17A, 17B and 17C) for the creation of the fillport is of any suitable material having some specific properties, e.g. it is different from the gasket materials, has a higher melting temperature ($T_m$) than the gasket material and does not melt, flow or adhere to the gasket material under the heating conditions described herein. Generally, glass, metal, ceramic, and organic polymers or combinations thereof are used.

(G) Stacking

A stack is created by starting with an endplate and alternating gasket material, cord, electrode, gasket, cord electrode until the desired number of cells is created ending with a second endplate and optionally with a gasket material on the top outside of the stack.

(H) Assembling (heating and cooling)

The stack is heated under pressure to cause reflow of the gasket material, adhering and sealing the perimeter of the electrode materials to the adjacent electrode in the stack; thereby, creating isolated cells and an assembled stack unit.

(a) Radio Frequency Induction Heating is used to heat the stack to cause reflow of the gasket material.

(b) Radiant Heating is used to uniformly heat the stack to cause reflow of the gasket material. A preferred method is to use 1–100 μm radiation at 0.5–10 watts/cm$^2$ for 1–20 min.

(c) Conductive and/or convective heating in a furnace, optionally in an inert atmosphere, is used to heat the stack to cause reflow of the gasket material.

(I) Creating the fillport

The cords are pulled to remove them from the assembled unit to create a dry preunit with at least one fillport per cell.

(J) Post-Conditioning

It has been found that a number of post-conditioning reactive gas treatments of the stack or assembled stack or combinations thereof are useful to improve the electrical characteristics of the electrode and resulting device. These include either before step (H) and/or after step (I) treatment with hydrogen, nitric oxide, carbon monoxide, ammonia, and other reducing gasses or combinations thereof at between ambient temperature and the $T_m$ of the gasket material at a reduced pressure or under pressure.

(K) Filling of Dry Preunit

The dry preunit is filled with an ionically conducting aqueous or non-aqueous electrolyte.

(L) Sealing of Fillports

The fillports are sealed by reflowing an additional film of polymer, the same or different, over the openings to create a device. This is commonly done with an induction heater, locally heating the film over the fillport opening.

(M) Burn-In

The device is brought to full charge by initially charging the device to 0.1 V/cell at a charging current of about 4 mA/cm$^2$.

(N) Testing

Termination Methods—Several methods are used to make electrical connections to Ultracapacitor endplates as described below as examples.

1. Endplate Tabs (60 and 60A). The endplates (18A and 18B) themselves have been cut to extend out beyond the normal gasket perimeter. These extensions allow attachment of a wire or ribbon. Typically, the extension is a stub from which all oxide material is removed down to the bare titanium; 5 mil thick nickel ribbon is spot welded to the stub.

2. Silver Epoxy The oxide coating is removed from the exposed faces of the endplates or the endplates may be coated only on one side. Clean nickel foil leads make electrical connection to the exposed faces by bonding them together with a conductive silver epoxy.

3. Lugs Threaded titanium nuts are welded to the thick titanium endplates before coating. Electrical connection to the titanium nuts is achieved by screw attachment.

4. Press Contacts The oxide is removed or the endplates may be coated only on one side from the exposed side of the endplates before assembly into the device stack. The bare titanium is reversed sputtered to clean the surface, being careful not to overheat the substrate. The clean surface is then sputtered with titanium to lay down a clean adhesion layer, followed by gold. The gold acts as a low contact resistance surface to which electrical contact can be made by pressing or by wire bonding.

5. Deposition of a compatible medium such for example, aluminum, gold, silver, etc. outside by CVD or other means.

The device resistance is measured at 1 Khz. The device capacitance is determined by measuring the coulombs needed to bring the device to full charge at a charging rate of around 4 mA/cm$^2$ of electrode area. Leakage current is measured as the current needed to maintain a full charge after 30 min. of charging.

These devices may be made in various configurations depending on the desired application. By adjusting the device voltage, cell voltage, electrode area, and/or coating thickness in a rational manner, devices made to fit defined specifications can be constructed.

The electrode capacitance density (C' in units of F/cm$^2$) is roughly 1 F/cm$^2$ for every 10 μm of coating. Therefore, for large capacitance values a thicker coat is used. The device capacitance (C) is equal to the electrode capacitance density times the electrode area (A in units of cm$^2$) divided by two times the number of cells (n) (equation 1).

The leakage current (i") is proportional to the electrode area, while the equivalent series resistance (ESR) is inversely proportional to the electrode area (eqn. 2). Typical values for i" are less than 20 μA/cm$^2$.

The total number of cells in a device (n) is equal to the cell voltage (V') divided by the total device voltage (V) (eqn. 3). Cell voltages up to about 1.2 V can be used.

The device height (h), based on a cell gap (h') and a support thickness (h"), is determined from the number of cells and the electrode capacitance density in units of cm by equation 4.

The device ESR is a function of the number of cells times the cell gap (h') times the resistivity of the electrolyte (r) times a factor of about 2 divided by the area (equation 5).

$$C=C'A/2n \qquad \text{eqn. 1}$$

$$i''\alpha A \; \alpha 1/ESR \qquad \text{eqn. 2}$$

$$n=V/V' \qquad \text{eqn. 3}$$

$$h/cm=n(0.002C'+h'+h'') \qquad \text{eqn. 4}$$

$$ESR \approx 2nh'r/A \qquad \text{eqn. 5}$$

Devices are constructed to meet the requirements of various applications by considering the voltage, energy, and resistance requirements. The following examples are not meant to be limiting in any way:

For electric vehicle applications about a 100 KJ to 3 MJ device is used. A large voltage (about 100 to 1000 V) large energy (1–5 F/cm$^2$) storage device is used with an electrode area of about 100 to 10000 cm$^2$.

For electric heated catalyst applications for reduction of automobile cold start emissions about a 10 to 80 KJ device is used. This device is about 12 to 50 V constructed with around 100 to 1000 cm$^2$ area electrodes of 1–5 F/cm$^2$. Optionally, a device consisting of several devices in parallel can be constructed to meet the electrical requirements.

For defibrillator applications about a 200–400 V device with 0.5 to 10 cm$^2$ area electrodes of 1–3 F/cm$^2$ are used.

For uninterruptable power source applications various series/parallel device configurations may be used.

The following examples are presented to be descriptive and explanatory only. They are not to be construed to be limiting in any manner.

EXAMPLE 1

Fabrication of Dry Preunit (A) Coating Method

The support structure is prepared by etching a 1 mil titanium sheet with 35% HNO$_3$/1.5% HF at 60° C. for 5 min. The end plates are 5 mil titanium.

The oxide coating solution is 0.2M ruthenium trichloride trihydrate and 0.2M niobium pentachloride in tert-butanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min, pyrolyzed at 350° C. for 10 min and removed to cool to ambient temperature all in ambient atmosphere.

The dip-coating steps are repeated for 10 coats (or any desired number) rotating the Ti sheet so as to dip with alternate sides down.

The fully coated sheet is finally annealed at 350° C. for 3 hrs in ambient atmosphere.

(B) Electrode Pretreatment

The coated electrode is contacted with saturated steam in a closed vessel at 280° C. for 3 hrs under autogenic pressure.

(C) Spacing

Microprotrusions are screen printed on one side of the electrode. The epoxy compound is EP21AR from Masterbond, Hackensack, N.J. See U.S. patent application Ser. No. 947,414.

The epoxy protrusions are cured at 150° C. for 4 hrs. in air. The coated electrodes are next die-stamped to the desired shape.

(D) Gasket

A modified high density polyethylene (HDPE, improved puncture resistance and adhesion) gasket 1.5 mil thick by 30 mil wide with outside perimeter the same as that of the electrode is placed on the electrodes on the same side as the microprotrusions and impulse heat laminated. The HDPE is PJX 2242 from Phillips-Joanna of Ladd, Ill.

(E) Cord

One cord (TEFZEL®) 1 mil thick by 10 mil wide is placed across the narrow dimension of the gasket and electrode surface and aligned between microprotrusions. The location of the cord is one of three positions a centered, left of center, or right of center.

A second HDPE gasket is placed on the first gasket sandwiching the cord between the two gaskets.

The second gasket is impulse heated to adhere to the first gasket and to fix the cord in place.

(F) Stacking

Electrode/microprotrusion/gasket/cord/gasket units are stacked in a non-metallic (ceramic) alignment fixture beginning with a 5 mil end plate unit to the desired number of cells and ending with a plain 5 mil end plate with the cords arranged such that the location is staggered-left, center, right in a three unit repeating cycle (end perspective). Light pressure is applied to the top of the stack through a ceramic piston block to maintain uniform alignment and contact throughout the stack.

(G) Reflow

A radio frequency induction heater (2.5 Kw) is used to heat the stack. The stack was placed centrally in the three turn, 3 inch diameter coil and heated for 90 seconds at a power setting of 32%. The unit is allowed to cool to ambient temperature.

(H) Cord Removal

The cords are removed by pulling the exposed ends to leave the open fill ports.

EXAMPLE 2

Fabrication of Dry Preunit (A) Coating Method

The support structure is prepared by etching a 1 mil titanium sheet with 50% HCl at 75° C. for 30 min. The end plates are 2 mil titanium.

The oxide coating solution is 0.3M ruthenium trichloride trihydrate and 0.2M tantalum pentachloride in isopropanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min. in ambient atmosphere, pyrolyzed at 330° C. for 15 min in a 3 cubic feet per hour flow of 50vol. % oxygen and 50% nitrogen, and removed to cool to ambient temperature in ambient atmosphere.

The dip-coating steps are repeated for 30 coats (or any desired number) rotating the Ti sheet so as to dip with alternate sides down.

The fully coated sheet is finally annealed at the above conditions for 3 hrs.

(C) Spacing

VITON® microprotrusions are screen printed on one side of the electrode (by adapting patent application Ser. No. 947,414.

The VITON® protrusions are cured at 150° C. for 30 min. in air. The coated electrodes are next die-stamped to the desired shape.

(D) Gasket

A modified high density polyethylene (HDPE, improved puncture resistance and adhesion) gasket 1.0 mil thick by 20 mil wide with outside perimeter the same as that of the electrode is impulse heat laminated to both sides of the electrode. The HDPE is grade PJX 2242 from Phillips-Joanna of Ladd, Ill.

(E) Cord

One cord, 1 mil diameter TEFLON® (polytetrafluoroethylene, a trademark of the DuPont Co. of Wilmington, Del.) coated tungsten wire is placed across the narrow dimension of the gasket and electrode surface and aligned between microprotrusions. The location of the cord is one of three positions: centered, left of center, or right of center.

(F) Stacking

Electrode/microprotrusion/gasket/cord/gasket units are stacked beginning with a 2 mil end plate unit to the desired number of cells and ending with a plain 2 mil end plate with the cords arranged such that the location is staggered-left, center, right in a three unit repeating cycle (end perspective).

(G) Reflow

The gasket is reflowed in nitrogen at 125° C. for 120 min. to reflow the thermoplastic. The unit is cooled in nitrogen to ambient temperature.

(H) Cord Removal

The cords are removed by pulling the exposed ends to leave the open fill ports.

EXAMPLE 3

Fabrication of Dry Preunit (A) Coating Method

The support structure is prepared by etching a 1 mil titanium sheet with 50% HCl at 75° C. for 30 min. The end plates are 10 mil titanium.

The oxide coating solution is 0.2M ruthenium trichloride trihydrate and 0.2M tantalum pentachloride in isopropanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min, pyrolyzed at 300° C. for 5 min and removed to cool to ambient temperature all in ambient atmosphere.

The dip-coating steps are repeated for 10 coats (or any desired number) rotating the Ti sheet so as to dip with alternate sides down.

The fully coated sheet is finally annealed at 300° C. for 3 hrs in ambient atmosphere.

(B) Electrode Pretreatment

The coated electrode is contacted with saturated steam in a closed vessel at 260° C. for 2 hrs under autogenic pressure.

(C) Spacing

Microprotrusions are screen printed on one side of the electrode, 947,414. The epoxy compound is brand EP21AR from Masterbond, Hackensack, N.J.

The epoxy protrusions are cured at 150° C. for 4 hrs. in air. The coated electrodes are next die-stamped to the desired shape.

(D) Gasket

A modified high density polyethylene (HDPE, improved puncture resistance and adhesion) gasket 1.5 mil thick by 30 mil wide with outside perimeter the same as that of the electrode is placed on the electrodes on same side as the microprotrusions and impulse heat laminated. The HDPE is brand PJX 2242 from Phillips-Joanna of Ladd, Ill.

(E) Cord

One cord (TEFZEL®) 1 mil thick by 10 mil wide is placed across the narrow dimension of the gasket and electrode surface and aligned between microprotrusions. The location of the cord is one of three positions: centered, left of center, or right of center.

A second HDPE gasket is placed on the first gasket sandwiching the cord between the two gaskets.

The second gasket is impulse heated to adhere to the first gasket and to fix the cord in place.

(F) Stacking

Electrode/microprotrusion/gasket/cord/gasket units are stacked beginning with a 10 mil end plate unit to the desired number of cells and ending with a plain 10 mil end plate with the cords arranged such that the location is staggered-left, center, right in a three unit repeating cycle (end perspective).

(G) Reflow

The gasket is reflowed in nitrogen at 160° C. for 45 min. to reflow the thermoplastic. The unit is cooled in nitrogen to ambient temperature.

(H) Cord Removal

The cords are removed by pulling the exposed ends to leave the open fill ports.

EXAMPLE 4

Fabrication of Device (A) Coating Method

The support structure is prepared by etching a 1 mil titanium sheet with 50% HCl at 75° C. for 30 min. The end plates are 5 mil titanium.

The oxide coating solution is 0.2M ruthenium trichloride trihydrate and 0.2M Ti(di-isopropoxide)bis 2,4-pentanedionate in ethanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min, pyrolyzed at 350° C. for 5 min in oxygen and removed to cool to ambient temperature all in ambient atmosphere.

The dip-coating steps are repeated for 30 coats (or any desired number) rotating the Ti sheet so as to dip with alternate sides down.

The fully coated sheet is finally annealed at 350° C. for hrs in an oxygen atmosphere.

(C) Spacing

Microprotrusions are thermally sprayed through a mask on one side of the electrode. The thermal spray material is (TEFLON®) from E.I. du Pont de Nemours & Co., Wilmington, Del.

The TEFLON® protrusions are cured at 350° C. for 0.5 hrs. in air. The coated electrodes are next die-stamped to the desired shape.

(D) Gasket

A modified high density polyethylene (HDPE, improved puncture resistance and adhesion) gasket 1.5 mil thick by 30 mil wide with outside perimeter the same as that of the electrode is placed on the electrodes on same side as the microprotrusions and impulse heat laminated. The HDPE is brand PJX 2242 from Phillips-Joanna of Ladd, Ill.

(E) Cord

One cord (TEFZEL®) 1 mil thick by 10 mil wide is placed across the narrow dimension of the gasket and electrode surface and aligned between microprotrusions. The location of the cord is one of three positions: centered, left of center, or right of center.

A second HDPE gasket is placed on the first gasket sandwiching the cord between the two gaskets.

The second gasket is impulse heated to adhere to the first gasket and to fix the cord in place.

(F) Stacking

Electrode/microprotrusion/gasket/cord/gasket units are stacked beginning with a 5 mil end plate unit to the desired number of cells and ending with a plain 5 mil end plate with the cords arranged such that the location is staggered-left, center, right in a three unit repeating cycle (end perspective).

(G) Reflow

The gasket is reflowed in nitrogen at 190° C. for 30 min. to reflow the thermoplastic. The unit is cooled in nitrogen to ambient temperature.

(H) Cord Removal

The cords are removed by pulling the exposed ends to leave the open fill ports.

EXAMPLE 5

Fabrication of Dry Preunit (A) Coating Method

The support structure is prepared by etching a 0.8 mil zirconium sheet with 1% HF/20% $HNO_3$ at 20° C. for 1 min. The end plates are 2 mil zirconium.

The oxide coating solution is 0.2M ruthenium trichloride trihydrate and 0.1M tantalum pentachloride in isopropanol (reagent grade).

The etched Ti sheets are dip-coated by immersion into the solution at ambient conditions. The coated sheet is submerged into the solution, held for about 1 sec and then removed.

After each coating, the oxide is dried at 85° C. for 10 min, pyrolyzed at 310° C. for 7 min and removed to cool to ambient temperature all in ambient atmosphere.

The dip-coating steps are repeated for 10 coats (or any desired number) rotating the Ti sheet so as to dip with alternate sides down.

The fully coated sheet is finally annealed at 310° C. for 2 hrs in ambient atmosphere.

(C) Spacing

Microprotrusions are thermally sprayed through a mask on one side of the electrode. The thermal spray material is TEFLON® from E.I. du Pont de Nemours & Co., Wilmington, Del.

The TEFLON® protrusions are cured at 310° C. for 1.0 hrs. in air. The coated electrodes are next die-stamped to the desired shape.

(D) Gasket

A polypropylene gasket 1.5 mil thick by 30 mil wide with outside perimeter the same as that of the electrode is placed on the electrodes on same side as the microprotrusions and impulse heat laminated.

(E) Cord

One cord, 1 mil diameter TEFLON® coated tungsten wire, is placed across the narrow dimension of the gasket and electrode surface and aligned between microprotrusions. The location of the cord is one of three positions centered, left of center, or right of center.

A second polypropylene gasket is placed on the first gasket sandwiching the cord between the two gaskets.

The second gasket is impulse heated to adhere to the first gasket and to fix the cord in place.

(F) Stacking

Electrode/microprotrusion/gasket/cord/gasket units are stacked beginning with a 2 mil end plate unit to the desired number of cells and ending with a plain 2 mil end plate with the cords arranged such that the location is staggered-left, center, right in a three unit repeating cycle (end perspective).

(G) Reflow

The gasket is reflowed in nitrogen at 195° C. for 60 min. to reflow the thermoplastic. The unit is cooled in nitrogen to ambient temperature.

(H) Cord Removal

The cords are removed by pulling the exposed ends to leave the open fill ports.

EXAMPLE 6

Filling of the Electrode Space

A dry preunit may be filled with an electrolyte with the following procedure. Any of many possible dry preunit configurations may be used.

(H) Back Fill

The cords are removed to open the fillport. The stacked unit is placed into an evacuation chamber and evacuated to <±mtorr for 5 to 60 min. The liquid electrolyte 3.8M $H_2SO_4$ de-airated with nitrogen, is introduced into the chamber and fills the evacuated space between the electrodes.

(I) Seal Fillport Openings

The electrolyte filled preunit is removed from the chamber. It is rinsed with deionized water to remove excess electrolyte and dried. HDPE film (1.5 mil thick) is placed over the fillport openings and impulse heat sealed over the ports.

(J) Conditioning

The device is charged up to full charge beginning at 0.1 V/cell increasing by 0.1 V/cell until 1 V/cell is obtained (K) Testing The device is tested in the conventional manner, having 1 V/cell with leakage current of less than 25 $\mu A/cm^2$, and a capacitance density per cell of greater than about 0.1 $F/cm^2$. A 10 V device has a height of no more than 0.05", a 40 V device has a height of no more than 0.13". and a 100 V device has a height of no more than 0.27".

Performance characteristics for various device geometries and configurations based on a sulfuric acid electrolyte are presented in Table 1.

TABLE 1

| Device Performance Characteristics | | | | | | |
|---|---|---|---|---|---|---|
| Area/cm² | 2 | 2 | 2 | 2 | 25 | 25 |
| volt | 10 | 40 | 100 | 100 | 100 | 100 |
| C/mF | 26 | 6.7 | 2.6 | 10 | 150 | 753 |
| ESR/mohm | 100 | 330 | 780 | 780 | 62 | 70 |
| vol/cc | 0.29 | 0.73 | 1.6 | 1.6 | 11 | 32 |
| J/cc | 4.5 | 7.4 | 8.1 | 31 | 69 | 116 |
| watt/cc | 860 | 1660 | 2000 | 2000 | 3670 | 1100 |

EXAMPLE 7

Filling of the Electrode Space

A dry preunit may be filled with an electrolyte with the following procedure. Any of many possible dry preunit configurations may be used.

(H) Back Fill

The cords are removed to open the fillport. The stacked unit is placed into an evacuation chamber and evacuated to <35 mtorr for 5 to 60 min. The liquid non-aqueous electrolyte 0.5M $KPF_6$ in propylene carbonate de-airated with nitrogen is introduced into the chamber and fills the evacuated space between the electrodes.

(I) Seal Fillport Openings

The electrolyte filled preunit is removed from the chamber and excess electrolyte is removed. HDPE film (1.5 mil thick) is placed over the fillport openings and impulse heat sealed over the ports.

(J) Conditioning

The device is charged up to full charge beginning at 0.1 V/cell increasing by 0.1 V/cell until 1.5 V/cell is obtained.

(K) Testing

The device is tested in the conventional manner, having 1.5 V/cell with leakage current of around 100 $\mu A/cm^2$, and a capacitance density of around 4 $mF/cm^2$ for a 10 cell device.

EXAMPLE 8

Device Post-Treatment Conditions

The following is a list of the electrical properties (Table 3) of devices using various gas postconditioning techniques to adjust the electrode rest potential so that charging to at least 1 V/cell on multicell devices filled with 4.6M sulfuric acid electrolyte is possible and reduced leakage currents are observed. This treatment is done before, during, and/or after reflow of the gasket material. For gas treatment at temperatures below that used for gasket reflow the atmosphere was exchanged with an inert gas such as nitrogen or argon during reflow. For treatment after reflow, of the gasket material the tabs were removed before treatment. During treatment the atmosphere is evacuated and filled with the reactive gas periodically.

TABLE 3

Device characteristics for various postconditioning.

| gas | T/°C. | t/min. | i"/μA/cm² | V/cell |
|---|---|---|---|---|
| $H_2$ | 50 | 20 | 8 | 1.0 |
| CO | 100 | 170 | 40 | 1.0 |
| CO | 90 | 103 | 12 | 1.0 |
| CO | 90 | 165 | 20 | 1.0 |
| CO | 80 | 120 | 25 | 1.1 |
| NO | 75 | 20 | 27 | 1.0 |
| NO | 95 | 140 | 21 | 1.1 |
| $NH_3$ | 85 | 30 | 26 | 1.0 |

While only a few embodiments of the invention have been shown and described herein, it will become apparent to those skilled in the art that various modifications and changes can be made in the improved method to produce an electrical storage device such as a battery or a capacitor having improved lifetime and charge/recharge characteristics and low leakage current, and the device thereof without departing from the spirit and scope of the present invention. All such modifications and changes coming within the scope of the appended claims are intended to be carried out thereby.

We claim:

1. An improved method to produce a dry preunit of an electrical storage device for storage of electrical charge in a condition to have the electrode surfaces contacted with a non-aqueous or aqueous electrolyte to store electrical charge in a double layer manner, which method comprises:

(a) preparing a thin in thickness substantially flat sheet of electrically conducting support material coated on each flat side with the same or different thin layer of a second electrically conducting material having a high surface area, optionally with the provision that both flat sides of the electrically conducting support is a sheet having the perimeter edge surfaces either:
(i) having a thin layer of second electrically conducting material,
(ii) are partly devoid of second electrically conducting material, or
(iii) are devoid of second electrically conducting material;

(b) creating an ion permeable or semipermeable space separator stable to the aqueous or non-aqueous electrolyte obtained by:
(i) depositing substantially uniform in height groups of electrically insulating microprotrusions, on the surface of at least one side of the thin layer of second electrically conducting material,
(ii) placing a thin precut ion permeable or semipermeable separator on one surface of the second electrically conducting material, or
(iii) casting an ion permeable or semipermeable thin layer on the surface of at least one side of the electrically conducting material, or
(iv) creating an air space as separator;

(c) contacting the perimeter edge surface of one or both sides of the thin sheet of step (b) with one or more layers of synthetic organic polymer as a gasket material selected from the group consisting of a thermoplastic and a thermoset polymer;

(d) placing on or within the gasket material and optionally across the thin sheet at least one cord of a different material in which the cord has a higher melting point ($T_m$) greater than the gasket polymer material and does not melt, flow, or permanently adhere to the gasket under the processing conditions;

(e) producing a repeating layered stack of the thin flat articles of sheet coated with metal oxide and separator produced in step (d) optionally having the end sheets consisting of a thicker support;

(f) heating the stack produced in step (e) at a temperature and applied pressure effective to cause the synthetic gasket material to flow, to adhere to, and to seal the edges of the stack creating a solid integral stack of layers of alternating electrically conductive sheet coated with second electrically conducting material and the ion permeable separator, optionally such that the gasket material creates a continuous integral polymer enclosure;

(g) cooling the solid integral stack of step (f) optionally in an inert gas under slight pressure; and (h) removing the at least one cord of different material between each layer creating at least one opening between the layers of electrically conducting sheet coated with second electrically conducting material.

2. The method of claim 1 wherein in step (a) the second electrically conducting material is selected from carbon, one or more metal oxides, or combinations thereof.

3. The improved method of claim 1 wherein in step (b) only step (i) is performed.

4. The method of claim 3 wherein in step (b) the electrically insulating microprotrusions comprise ceramics, organic elastomers, thermoplastics, thermosets, or combinations thereof.

5. The improved method of claim 1 wherein
in step (a) substep (iii) the perimeter edges are devoid of second electrically conducting material; and
in step (f) the stack is sealed by heating the stack to between about 5° and 100° C. above the melting point temperature $T_m$ of the gasket material.

6. The improved method of claim 1 wherein in step (a) substep (ii) the perimeter edges are partially devoid of second electrically conducting material.

7. The improved method of claim 6 wherein in step (d) and also in step (h) the thin cord comprises metal, ceramic, organic polymeric material or combinations thereof, which material is different from the gasket material and the gasket material is a thermoplastic.

8. The improved method of claim 1 wherein in step (b) only substep (ii) is performed.

9. The improved method of claim 8 wherein in step (a), substep (i) the perimeter edges include the second electrically conducting material; and
in step (f) the alternating stack is sealed by heating the stack to between about 5° an 100° C. above the $T_m$ of the thermoplastic gasket material.

10. The improved method of claim 1 wherein in step (b) only substep (iii) is performed.

11. The method of claim 1 wherein after step (a) and before step (b),
(a') the second electrically conducting material coated on the electrically conducting sheet is contacted with saturated steam at between about 150° to 325° C. for about 1 to 6 hr in a closed vessel under autogenic pressure.

12. The method of claim 1 wherein either after step (e) and before step (f) or after step (h), the integral stack is treated by
(j) evacuating the dry preunit to substantially remove residual gases;
(k) contacting the dry unit with one or more reducing gases at near ambient pressure;

(l) heating the unit and reducing gas to about 20° to 150° C. for between about 0.1 and 5 hr;

(m) evacuating the dry preunit;

(n) replacing the reducing atmosphere with inert gas; and (o) repeating steps (j), (k), (l), (m), and (n) at least once.

13. The method of claim 11 wherein either after step (e) and before step (f) or after step (h), the integral stack is treated by (j) evacuating the dry preunit to substantially remove residual gases;

(k) contacting the dry unit with one or more reducing gases at near ambient pressure;

(l) heating the unit and reducing gas to about 20° to 150° C. for between about 0.1 and 5 hr;

(m) evacuating the dry preunit;

(n) replacing the reducing atmosphere with inert gas; and (o) repeating steps (j), (k), (l), (m), and (n) at least once.

14. The method of claim 12 wherein the vacuum in steps (j), (m) and (o) is about 250 mtorr or lower.

15. The method of claim 12 wherein the reducing gas is selected from hydrogen, carbon monoxide, nitric oxide, ammonia or combinations thereof; and the inert gas is selected from helium, neon, nitrogen, argon or combinations thereof;

and the one or more reducing gases and one or more inert gases are contacted in a sequential manner.

16. The method of claim 1 wherein the storage device is independently selected from a capacitor.

17. An improved method to produce an electrical storage device for storage of electrical charge, which method comprises:

evacuating the dry preunit produced by the method of claim 1, contacting the evacuated dry preunit with an electrolyte selected from aqueous inorganic acid or a non-aqueous organic electrolyte for a time sufficient to fill the space between the support sheets using the fillport formed, removing any exterior surface electrolyte, and closing the fillport openings, producing the electrical storage device.

18. An improved method to produce an electrical storage device for storage of electrical charge, which method comprises:

evacuating the dry preunit produced by the method of claim 11, contacting the evacuated dry preunit with an electrolyte selected from aqueous inorganic acid or a non-aqueous organic electrolyte for a time sufficient to backfill the space between the support sheets using the fillport, removing any exterior surface electrolyte, and closing the fillport openings, producing the electrical storage device.

19. An improved method to produce an electrical storage device for storage of electrical charge, which method comprises:

evacuating the preunit produced by the method of claim 12, contacting the evacuated dry preunit with an electrolyte selected from aqueous inorganic acid or a non-aqueous organic electrolyte for a time sufficient to backfill the space between the support sheets using the fillport, removing any exterior surface electrolyte, and closing the fillport openings, producing the electrical storage device.

20. An improved method to produce an electrical storage device for storage of electrical charge, which method comprises:

evacuating the preunit produced by the method of claim 13, contacting the evacuated dry preunit with an electrolyte selected from aqueous inorganic acid or a non-aqueous organic electrolyte for a time sufficient to backfill the space between the support sheets using the fillport, removing any exterior surface electrolyte, and closing the fillport openings, producing the electrical storage device.

21. The method of claim 1 wherein in step (a) the microprotrusions are formed on the thin layer of second electrically conducting material, and additional microprotrusions are located on the perimeter edge of the material.

22. The method of claim 1 wherein in step (b) gasket material is placed on the top of the device and the gasket material between the electrodes is of sufficient excess in volume so that upon heating in step (f) excess gasket material extrudes about the perimeter edges of the support to create a seamless integral surface at the edge of the stack unit.

23. The method of claim 1 wherein in step (a) the support has a second electrically conducting material on the perimeter edge surfaces, in step (b) the microprotrusions are on the surface of the second electrically conducting material, in step (c) the gasket material is a thermoplastic, in step (e) the end sheets are a thicker support material, in step (f) the gasket material is in excess to create a continuous integral enclosure, in step (g) the stack is cooled to ambient temperature in step (h) the cord comprises a metal, ceramic, organic polymer or combinations thereof.

24. An improved method to produce an electrical storage device for storage of electrical charge, which method comprises:

evacuating the dry preunit of claim 21, or 22, contacting the evacuated dry preunit with an electrolyte selected from aqueous inorganic acid or a non-aqueous organic electrolyte for a time sufficient to fill the space between the support sheets using the fillport, removing any exterior surface electrolyte, and closing the fillport openings.

25. An improved method to produce an electrical storage device for storage of electrical charge, which method comprises:

evacuating the dry preunit of claim 23, contacting the evacuated dry preunit with an electrolyte selected from aqueous inorganic acid or a non-aqueous organic electrolyte for a time sufficient to fill the space between the support sheets using the fillport, removing any exterior surface electrolyte, and closing the fillport openings.

26. The method of claim 1 wherein in step (a) the thin flat sheet support material has a thickness of between about 0.1 and 10 mil.

27. The method of claim 1 wherein in step (a), the thin coating of high surface area second electrically conducting material has a thickness of between about 0.1 and 100 μM.

28. The method of claim 1 wherein in step (a) the high surface area conducting material has a surface area of about or greater than 300 meters²/cc.

29. An improved method to produce a dry preunit of an electrical storage device for storage of electrical charge in a condition to have the electrode surfaces contacted with a non-aqueous or aqueous electrolyte to operate in a double layer manner, which method comprises:

(a) obtaining a thin flat metal sheet support wherein the metal is selected from titanium, zirconium, iron, copper, lead, tin, nickel, zinc or combinations thereof said support, having a thickness of between about 0.1 and 10 mil and coated on each flat surface with a thin layer of at least one metal oxide having a porous high surface area independently selected from metal oxides of the group consisting of tin, lead, vanadium, titanium, ruthenium, tantalum, rhodium, osmium, iridium, iron, cobalt, nickel, copper, molybdenum, niobium, chromium, manganese, lanthanum or lanthanum series metals or alloys or combinations thereof, possibly containing a small percentage of additives to enhance electrical conductivity, wherein the thin metal oxide layer has a thickness of between about 0.1 and 100 microns, optionally with the provision that both flat surfaces of the electrically conducting sheet have the perimeter edge surfaces devoid of metal oxide;

(b) creating an ion permeable space separator which is chemically stable to said aqueous or non-aqueous electrolyte selected from:

(i) depositing a substantially uniform in height array of electrically insulating microprotrusions which are stable to an aqueous or non-aqueous electrolyte, said microprotrusions having a height of between about 0.1 and 10 mil on the surface of one or both sides of the thin layer of porous metal oxide, (ii) placing a thin precut ion permeable electrically insulating separator having a thickness of between about 0.1 and 10 mil on one flat surface of the metal oxide layer;

(iii) casting an ion permeable or semipermeable separator having a thickness of between about 0.1 and 10 mil on at least one surface of the second electrically conducting material; or (iv) creating a thin air space as a separator;

(c) contacting the perimeter edge surface of one or both sides of the thin electrically conducting sheet of step (b) with one or more thin layers of synthetic organic polymer as a gasket material wherein the polymer is selected from the group consisting of polyimides, polyethylenes, polypropylenes, polyolefins, polysulfone, fluorinated polymers partly fluorinated polymers and combinations thereof;

(d) placing on or within the gasket material and optionally across the thin flat sheet at least one thin cord of a different material in which the has a higher melting temperature ($T_m$) than the polymeric gasket material, which cord does not melt, flow or adhere to the gasket material under the processing conditions described herein;

(e) assembling a repeating layered stack of the thin flat articles of sheet coated with metal oxide and separator produced in step (d) optionally having end sheets having only one side coated and/or being made of thicker support material;

(f) heating the layered stack of step (e) at 0° to 100° C. greater than the $T_m$ causing the gasket material to flow, to adhere to, and to seal the edges of the layered stack creating a solid integral layered stack of sheet and separator optionally enclosing the stack in an integral polymer enclosure;

(g) cooling to ambient temperature the solid integral stack of step (f) in an inert environment; and (h) removing the at least one thin cord between each layer creating at least one small opening between the electrode layers.

30. The method of claim 29 wherein in step (a) the metal support is titanium and the metal oxide is selected from ruthenium, tantalum or combinations thereof.

31. The method of claim 29 wherein in step (a) at least one of the metal oxides is a rutile structure.

32. The method of claim 29 or 30 wherein in step (b), substep (i) is performed and the microprotrusions comprise a polymeric epoxide.

33. The method of claim 29 or 30 wherein after step (a) and before step (b), (a') the second electrically conducting material coated on the electrically conducting sheet is contacted with saturated steam at between about 150° to 325° C. for about 1 to 6 hr in a closed vessel under autogenic pressure.

34. The method of claim 29 or 30 wherein the metal oxide is conditioned either:

after step (e) and before step (f), or after step (h) by (j) evacuating the dry unit;

(k) contacting the dry unit with a reducing gas to about ambient pressure;

(l) heating the unit and reducing gas to about 50° to 150° C. for between about 0.1 and 5 hr;

(m) evacuating the dry preunit;

(n) replacing the reducing atmosphere with inert gas; and (o) repeating steps (j), (k), (l), (m) and (n) at least one time.

35. The method of claim 34 wherein the reducing gas is selected from hydrogen, carbon monoxide, nitric oxide, ammonia and/or combinations thereof; and the inert gas is selected from helium, neon, nitrogen, argon or combinations thereof.

36. The improved method of claim 29 wherein in step (a), substep (i) the perimeter edges include the second electrically conducting material; and in step (f) the alternating stack is sealed by heating the stack to between about 5° and 100° C. above the $T_m$ of the thermoplastic gasket material.

37. The method of claim 29 wherein in step (b) only substep (ii) is performed.

38. The method of claim 29 wherein in step (b) only substep (iii) is performed.

39. The method of claim 29 wherein in step (b) only substep (iv) is performed.

40. The method of claim 34 wherein the vacuum in steps (j), (m) and (o) is about 250 mtorr or lower.

41. The method of claim 29 wherein in step (a) the microprotrusions are formed on the thin layer of second electrically conducting material, and additional microprotrusions are located on the perimeter edge of the material.

42. The method of claim 29 wherein in step (b) gasket material is placed on the top of the device and the gasket material between electrodes is of sufficient excess in volume so that upon heating in step (f) excess gasket material extrudes about the perimeter edges of the support to create a seamless integral exterior surface at the edge of the stack unit.

43. The method of claim 29 wherein in step (a) the support has a second electrically conducting material on the perimeter edge surfaces, in step (b) the microprotrusions are on the surface of the second electrically conducting material, in step (c) the gasket material is a thermoplastic, in step (e) the end sheets are a thicker support material, in step (f) the gasket material is in excess to create a continuous integral exterior enclosure, in step (g) the stack is cooled to ambient temperature, in step (h) the cord comprises a metal, ceramic, organic polymer or combinations thereof.

44. The method of claim 29 wherein in step (b), substep (i) is performed and the microprotrusions comprise a polymeric epoxide.

45. The method of claim 29 wherein the storage device is independently selected from a capacitor or a battery.

46. An improved method to produce an electrical storage device for storage of electrical charge, which method comprises:

evacuating the preunit of claim 29, contacting the evacuated dry preunit with an electrolyte selected from aqueous inorganic acid or a non-aqueous organic electrolyte for a time sufficient to fill the space between the support sheets using the fillport, removing any exterior surface electrolyte, and closing the fillport openings.

* * * * *